United States Patent
Valio et al.

(10) Patent No.: US 6,476,762 B2
(45) Date of Patent: Nov. 5, 2002

(54) METHOD FOR PERFORMING POSITIONING AND AN ELECTRONIC DEVICE

(75) Inventors: Harri Valio, Lempäälä (FI); Jari Syrjärinne, Tampere (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/753,918

(22) Filed: Jan. 3, 2001

(65) Prior Publication Data

US 2001/0008393 A1 Jul. 19, 2001

(30) Foreign Application Priority Data

Jan. 4, 2000 (FI) .................................................. 000017

(51) Int. Cl.$^7$ ............................................. H04B 7/185
(52) U.S. Cl. ............................. 342/357.02; 342/357.01
(58) Field of Search ...................... 342/357.02, 357.01, 342/357.06, 457; 701/213, 215; 455/12.1

(56) References Cited

U.S. PATENT DOCUMENTS

| 5,563,786 A | 10/1996 | Torii | 364/424.02 |
| 5,600,436 A | 2/1997 | Gudat | 356/141.3 |
| 5,745,074 A | 4/1998 | Laude | 342/357 |

FOREIGN PATENT DOCUMENTS

WO    WO 96/21163    7/1996

*Primary Examiner*—Dao Phan
(74) *Attorney, Agent, or Firm*—Perman & Green, LLP

(57) ABSTRACT

A code modulated signal transmitted by satellites (SV1–SV4) and formed by an individual code for each satellite (SV1–SV4) is received. At least one reference point (B) is selected, whose position is substantially known. Information is transmitted to the positioning means (S, MS) about the position of the at least one reference point, and about Ephemeris data on the satellites (SV1–SV4). Thus, at least the Ephemeris data on each of the satellites (SV1–SV4) to be used in the positioning and the location of the at least one reference point are used in the positioning of the receiver.

29 Claims, 5 Drawing Sheets

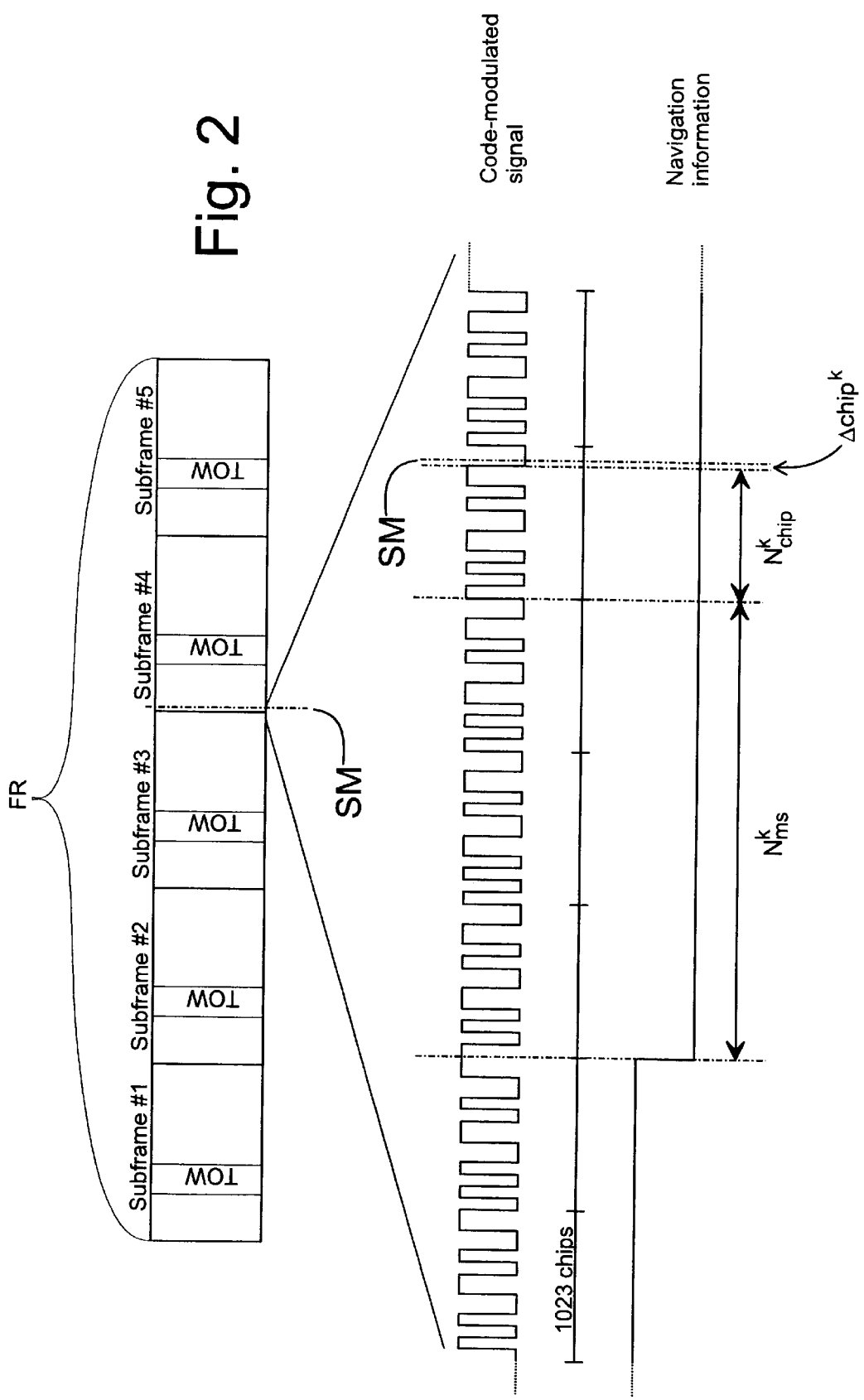

METHOD FOR PERFORMING POSITIONING AND AN ELECTRONIC DEVICE

Figure 1A:
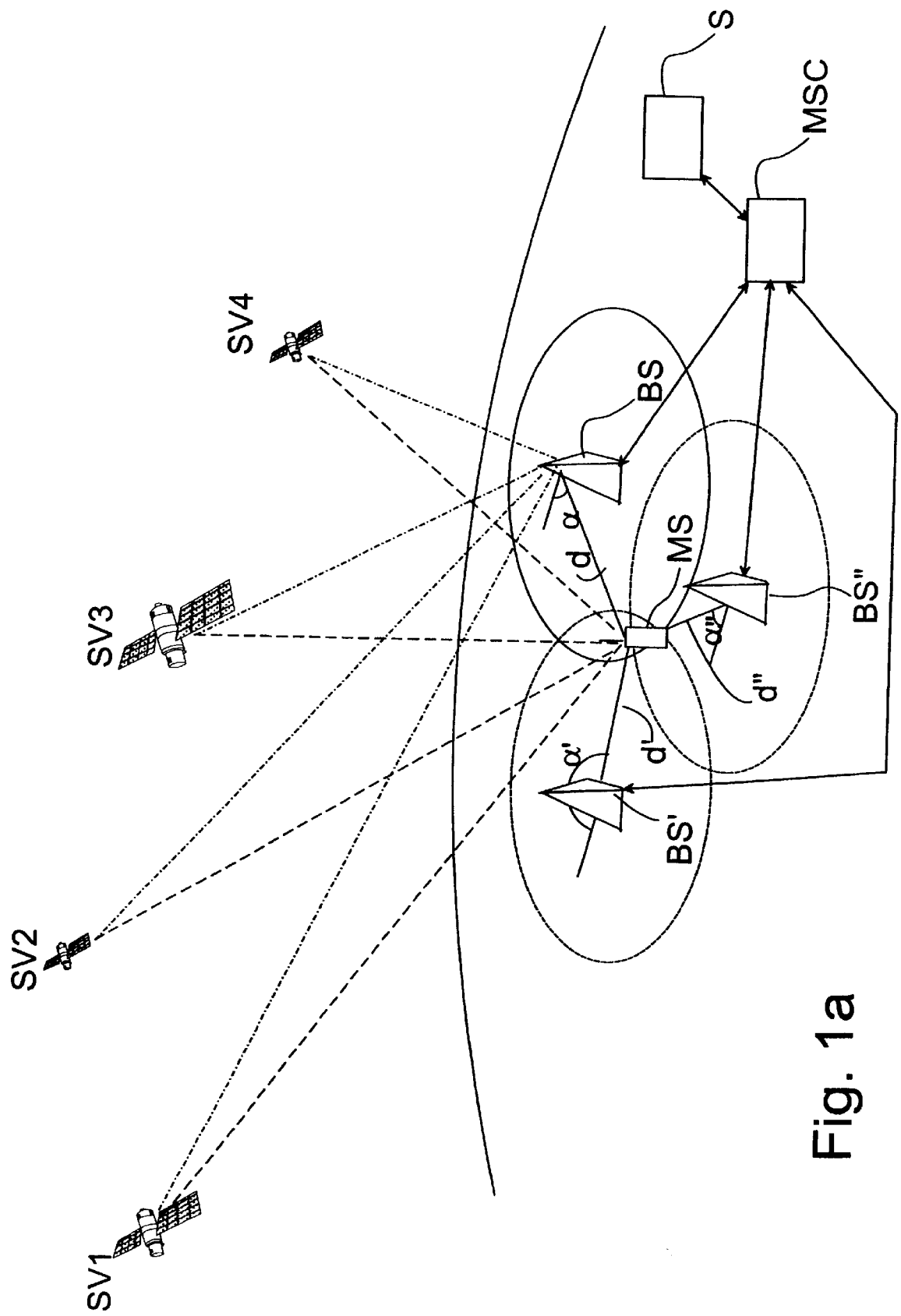

A code modulated signal transmitted by satellites (SV1–SV4) and formed by an individual code for each satellite (SV1–SV4) is received. At least one reference point (BS) is selected, whose position is substantially known. Information is transmitted to the positioning means (S, MS) about the position of the at least one reference point, and about Ephemeris data on the satellites (SV1–SV4). Thus, at least the Ephemeris data on each of the satellites (SV1–SV4) to be used in the positioning and the location of the at least one reference point are used in the positioning of the receiver.

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention
2. Description of the Related Art Including Information Disclosed Under 37 CFR 1.97 and 1.98.

One known positioning system is the GPS system (Global Positioning System), which presently covers more than 20 satellites, of which a maximum of 12 are simultaneously visible to a receiver. These satellites transmit e.g. Ephemeris data as well as data about the time of the satellite. A receiver used for positioning normally infers its location by calculating the time of propagation of a signal to be transmitted simultaneously from several satellites of the positioning system to the receiver. For the positioning, the receiver must typically receive the signals of at least four visible satellites to be able to calculate the position.

Each satellite operating in the GPS system transmits a so-called L1 signal at a carrier frequency of 1575.42 MHz. This frequency is also indicated as $154f_0$, in which $f_0=10.23$ MHz. Furthermore, the satellites transmit an L2 signal at a carrier frequency of 1227.6 MHz, i.e. $120f_0$. In the satellite, these signals are modulated with at least one pseudo sequence. This pseudo sequence is different for each satellite. As a result of modulation, a code-modulated wideband signal is generated. The modulation technique used makes it possible for the receiver to separate the signals transmitted by the different satellites, although the carrier frequencies used in the transmission are substantially the same. This modulation technique is called code division multiple access (CDMA). In each satellite, the pseudo sequence used for modulating the L1 signal is e.g. a so-called C/A code (Coarse/Acquisition code), as which a Gold code is used. Each GPS satellite transmits a signal by using an individual C/A code. The codes are formed as a modulo-2 sum of two binary sequences of 1023 bits. The first binary sequence G1 is formed with the polynomial $X^{10}+X^3+1$ and the second binary sequence G2 is formed by delaying the polynomial $X^{10}+X^9+X^8+X^6+X^3+X^2+1$ in such a way that the delay is different for each satellite. This arrangement makes it possible that different C/A codes can be formed with a similar code generator. Consequently, C/A codes are binary codes whose chipping rate in the GPS system is 1.023 MHz. The C/A code comprises 1023 chips, wherein the epoch of the code is 1 ms. The carrier frequency of the L1 signal is further modulated with navigation information at a bit rate of 50 bit/s. The navigation information comprises information about the health of the satellite, its orbit, time data, etc.

Satellites monitor the condition of their equipment during their operation. The satellites can use for example so-called watch-dog functions to detect and report failures possibly occurred in the equipment. The failures and functional disorders can be momentary or last a longer term. On the basis of the health data, some of the failures can possibly be compensated for, or the information transmitted by a failed satellite can be totally disregarded. Furthermore, in a situation in which the signal of more than four satellites can be received, the information received from different satellites can be weighted differently. It is thus possible to minimize errors in measurements which are possibly caused by satellites which seem unreliable.

To detect signals from the satellites and to identify the satellites, the receiver must perform synchronization, in which the receiver searches for the signal of each satellite at a time and attempts to be synchronized to this signal, so that the data to be transmitted with the signal can be received and demodulated.

A positioning receiver must perform synchronization e.g. when the receiver is turned on and also in a situation in which the receiver has not been able to receive a signal from any satellite for a long time. Such a situation can easily occur e.g. in portable devices, because the device is moving and the antenna of the device is not always optimally oriented with respect to the satellites, which weakens the strength of the signal entering the device. Also in urban areas, buildings affect the signal to be received, and moreover, so-called multipath propagation can occur, in which the transmitted signal enters the receiver via different propagation paths, e.g. directly from the satellite (line-of-sight) and also reflected from buildings. This multipath propagation causes that the same signal is received as several signals with different phases.

The positioning arrangement has two primary functions:
1. to calculate the pseudorange between the receiver and the different GPS satellites, and
2. to determine the position of the receiver by using the calculated pseudoranges and the position data of the satellites. The position data of the satellites at a time can be calculated on the basis of the Ephemeris and time correction data received from the satellites.

The distances to the satellites are called pseudoranges, because the time is not accurately known in the receiver. Thus, the determinations of the position and the time are iterated, until a sufficient accuracy has been achieved with respect to the time and the position. Because the time is not known with absolute accuracy, the position and the time must be determined e.g. by linearizing a set of equations for each new iteration.

The pseudorange can be calculated by measuring the reciprocal relative propagation delay diferences of signals from the different satellites. After the receiver has been synchronized with the received signal, the information transmitted in the signal can be determined.

Almost all known GPS receivers use correlation methods for acquisition and tracking of the code. Reference codes ref(k), i.e. the pseudo sequences of the different satellites, are stored or generated locally in the positioning receiver. The received signal is subjected to conversion to an intermediate frequency (down conversion), after which the receiver multiplies the received signal with the stored pseudo sequence. The signal formed as a result of the multiplication is integrated or low-pass filtered, wherein the result is information on whether the received signal contained a signal transmitted by a satellite. The multiplication to be performed in the receiver is iterated in such a way that each time, the phase of the pseudo sequence stored in the receiver is shifted. The correct phase is deduced from the correlation result preferably in such a way that when the correlation result is the greatest, the correct phase has been found. Thus, the receiver is correctly synchronized with the received signal.

The acquisition of the code is followed by fine adjustment of the frequency and by phase locking. This correlation result also indicates the information transmitted in the GPS signal.

The above-mentioned acquisition and frequency adjustment process must be performed for each signal of a satellite which is received in the receiver. In some receivers, there may be several receiving channels, wherein the aim is to synchronize each receiving channel with the signal of one satellite at a time and to find out the information transmitted by this satellite.

The positioning receiver receives information transmitted by satellites and performs positioning on the basis of the received information. To perform the positioning, the receiver must receive the signals transmitted by at least four different satellites, to be able to find out the x, y, z coordinates and the time data. The received navigation information is stored in a memory, wherein of this stored information, e.g. the Ephemeris data on the satellites can be used.

So-called differential positioning DGPS has been developed particularly for adjusting the positioning of a mobile receiver. Thus, the positioning receiver receives the signal from said four satellites and also uses positioning by a reference receiver to eliminate various errors. The reference receiver is typically stationary, and its position is known.

FIG. 1 shows, in a principle view, positioning by means of signals transmitted by four satellites SV1, SV2, SV3, SV4 and a reference receiver BS in a positioning receiver MS. In the GPS system, the satellites transmit Ephemeris data and time data, on the basis of which the positioning receiver can make calculations to determine the position of the satellite at a time. These Ephemeris data and time data are transmitted in frames which are further divided into subframes. FIG. 2 shows an example of such a frame structure FR. In the GPS system, each frame comprises 1500 bits which are divided into five subframes comprising 300 bits. Because the transmission of one bit takes 20 ms, the transmission of each subframe takes 6 s, and the whole frame is transmitted in 30 seconds. The subframes are numbered from 1 to 5. In each subframe 1, e.g. time data is transmitted, informing the moment of transmission of the subframe and information about the deviation of the satellite clock with respect to the time of the GPS system.

Subframes 2 and 3 are used for the transmission of Ephemeris data. Subframe 4 contains other system information, such as universal time data (UTC, Universal Time, Coordinated). Subframe 5 is intended for the transmission of almanac data of all satellites. The unit of these subframes and frames is called a GPS navigation message which comprises 25 frames, i.e. 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe was transmitted. Thus, the time data indicates the moment of transmission of a certain bit, i.e. in the GPS system, the moment of transmission of the last bit in the subframe. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

In the receiver, the moment of transmission $\hat{T}_{ToT}^k$ of the received signal can be determined for example in the following way:

$$\hat{T}_{ToT}^k = TOW^k + N_{bit}^k + N_{ms}^k + N_{chip}^k + \Delta chip^k \quad (1)$$

in which
- $TOW^k$ = the time data (time of week) contained in the last received subframe,
- $N_{bit}^k$ = the time, in milliseconds, corresponding to the number of bits received after the last bit of the bit corresponding to the time data, i.e. the last bit of the last received subframe containing the time data,
- $N_{ms}^k$ = the time, in milliseconds, passed since the reception of the last received bit,
- $N_{chip}^k$ = the number (from 0 to 1022) of whole chips received after the change of the last epoch,
- $\Delta chip^k$ = the measured code phase at the moment of positioning, and
- k = the satellite index.

The appended FIG. 3 illustrates this formula, and its different terms, used for estimating the moment of transmission of a signal received at a moment of positioning. It is obvious that FIG. 3 is simplified with respect to a real situation, because e.g. one code sequence comprises 1023 chips, wherein it is not reasonable to illustrate them precisely. The moment of positioning is illustrated by a dash and dot line which is indicated with the reference SM.

It is important to calculate the time of transmission of the received signal for each signal to be monitored, because the local reference time of the receiver, formed with the local oscillator of the receiver, is coupled on the basis of these values to the GPS time. Furthermore, the different propagation times of the signals received from different satellites can be deduced from these measured values, because each satellite transmits the same chip substantially at the same moment. Although there may be slight differences in the timings of different satellites, these are monitored, and error information is transmitted in the GPS navigation message, as was already mentioned above.

Under good receiving conditions and when an advantageous satellite constellation is used, the position of the user and the time error can be solved very accurately. A good constellation of satellites means that the satellites to be used for positioning are selected in such a way that, seen from the receiver, they are located in clearly different directions, that is, the solid angles in which the signals transmitted from different satellites enter the receiver, clearly differ from each other.

However, in a situation in which the received signal is faint, the received information contained in the navigation message cannot necessarily be utilized. Thus, the only usable measurements to be performed for the carrier frequency signal are the number of chips and the code phase. However, if the receiver has no proper Ephemeris data and no reference chronometer available, the position cannot be calculated solely on the basis of the number of the chips and the code phase. Further, old Ephemeris data does not give a sufficiently precise position for satellites, wherein the precision of the positioning is impaired. In the worst case, the receiver has no navigation data available, which means that the calculation of signal transmission times according to formula (1) cannot be made and the positioning will fail. In a corresponding manner, the lack of a reference chronometer will make it impossible with methods of prior art to estimate the GPS time, even though there were Ephemeris data available. This means that the Ephemeris data must be retrieved from another source that a received signal transmitted from satellites, to perform the positioning.

BRIEF SUMMARY OF THE INVENTION

It is an aim of the present invention to provide an improved method for positioning a receiver also when the signal strength is so weak that navigation information cannot be received. It is also an aim of the invention to provide a positioning receiver. The invention is based on the idea that a communication network is used for positioning, such as a mobile communication network with which the positioning receiver communicates. Thus, it can be taken into account that the positioning receiver is in the vicinity of a certain access point, such as a base station. Furthermore, the location of this base station is known. Thus, this base station can be used to transmit information which is necessary in the positioning to the positioning receiver.

The present invention can be used to achieve significant advantages when compared with methods and positioning devices of prior art. Upon applying the method of the invention, positioning can also be performed when navigation information cannot be received properly or at all. Furthermore, in a method according to a preferred embodiment of the invention, the effect of possible rounding-off errors on the positioning can be detected and corrected to correspond to the positioning.

In the method according to a preferred embodiment of the invention, the algorithms required in the positioning are primarily run in a computing server communicating with a communication network, wherein the computing can be performed considerably faster than in solutions of prior art.

Furthermore, a network-based implementation according to a preferred embodiment of the invention has still further advantages with respect to a network-aided receiver. When the positioning computing is performed in a communication network instead of the receiver, the communication network does not need to transmit any assisting data to be used in the positioning, such as Ephemeris data, to the receiver. Thus, the reduced need of data transmission will also reduced the load on the communication network.

In some situations, the first positioning (TTFF, time to first fix), for example after turning on of a positioning receiver, can be faster in a network-based implementation than in a network-aided implementation, because in the network-based implementation, the positioning receiver only needs to transmit the measured chip and code phase measurements to the computing server. The transmission of these measurement requires considerably fewer bits than the transmission of assisting data from the communication network to the positioning receiver. In particular, if the communication network is loaded, the positioning of the network-aided method can be delayed when the assisting data is delayed in the network. Instead, in the network-based implementation, the positioning can be computed substantially immediately after the server has received the chip and code phase measurements from the positioning receiver. This is substantially advantageous. Particularly in emergency situations, the computed location of the receiver is substantially immediately known and one does not have to wait for it from the positioning receiver.

Furthermore, the network-based implementation has the advantage that it is always possible to use the most recent Ephemeris data and possibly even DGPS corrections.

BRIEF DESCRIPTION OF THE SEVERAL VIEWS OF THE DRAWING(S)

Figure 1B:
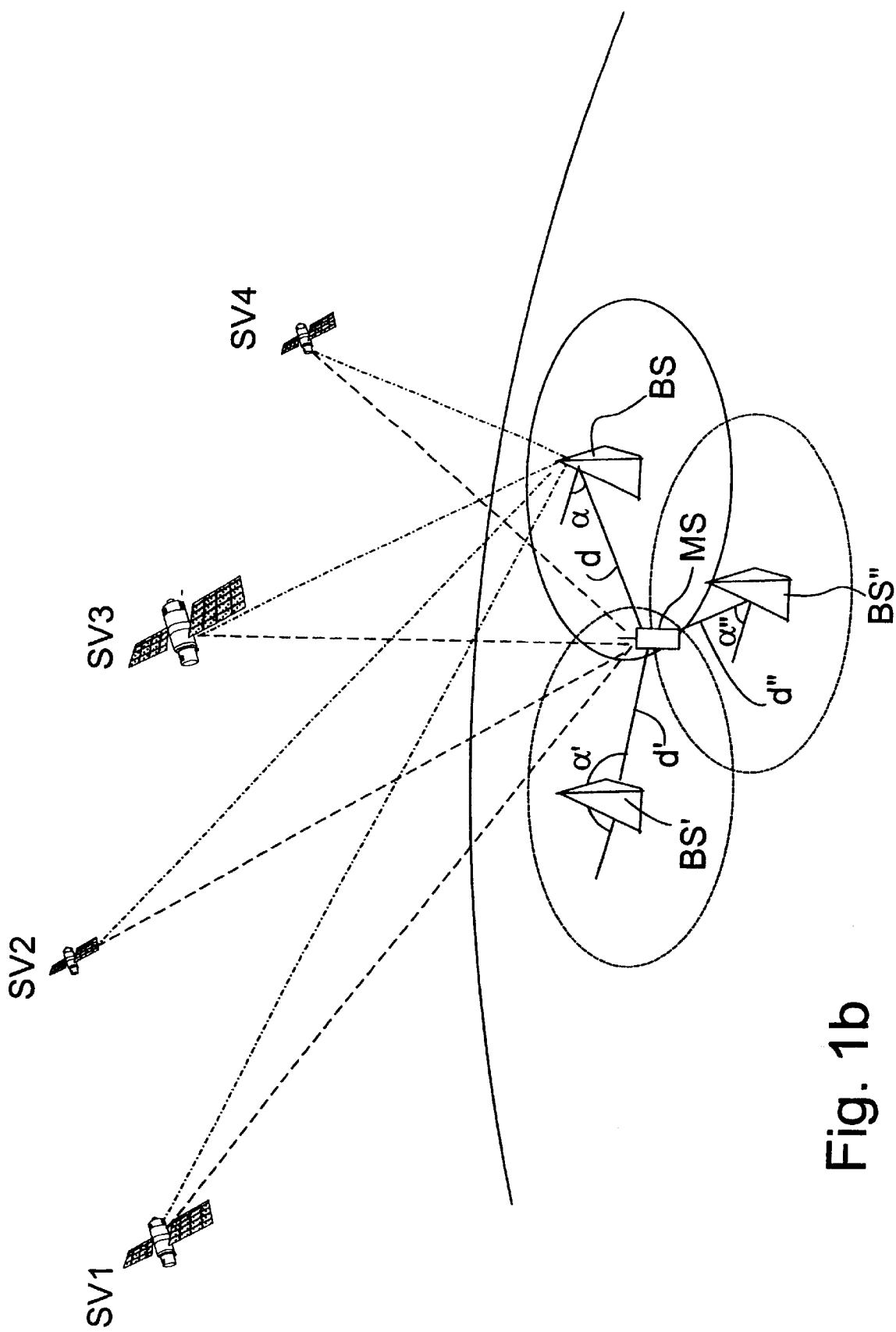
Figure 4:
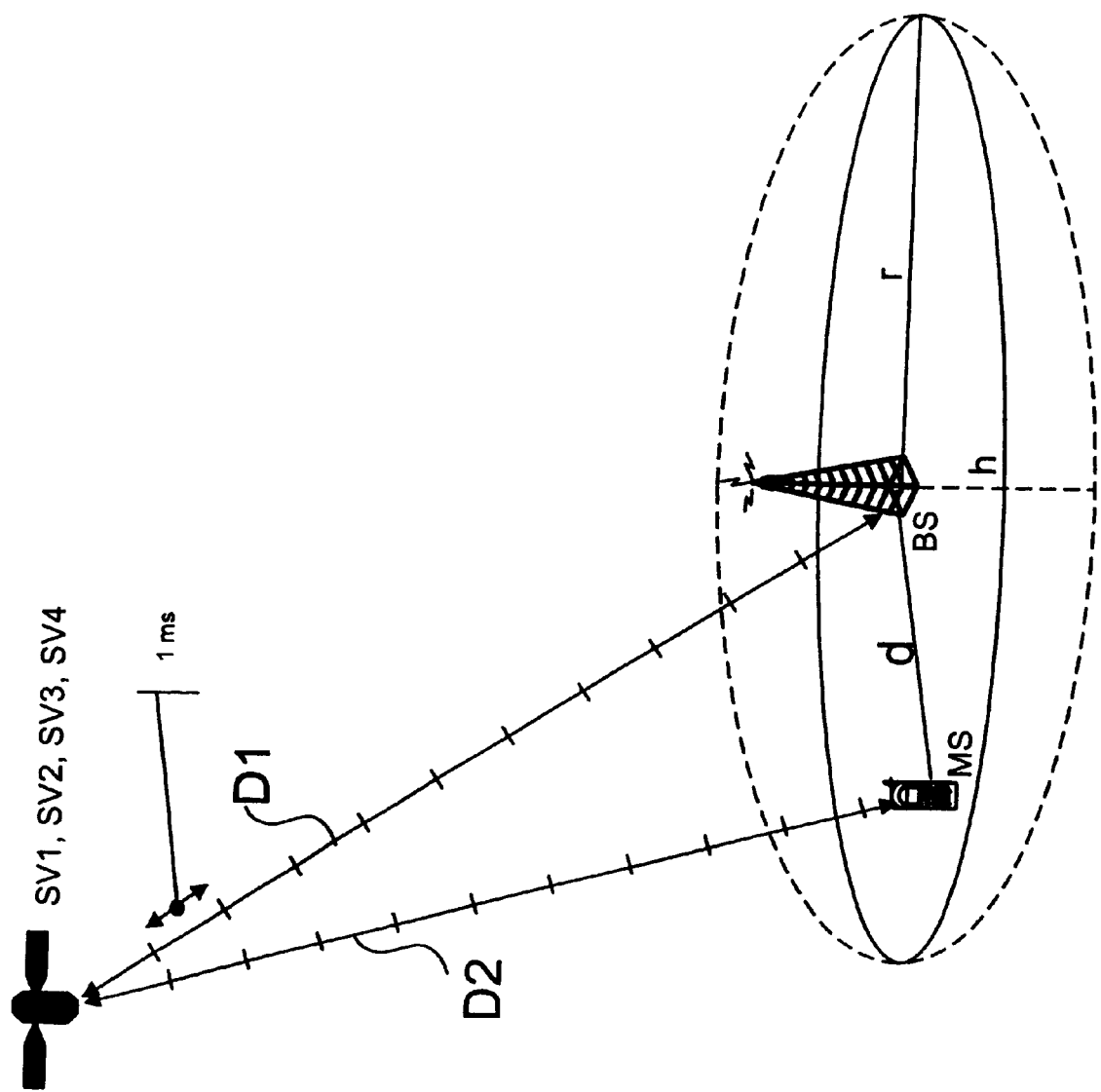
Figure 5:
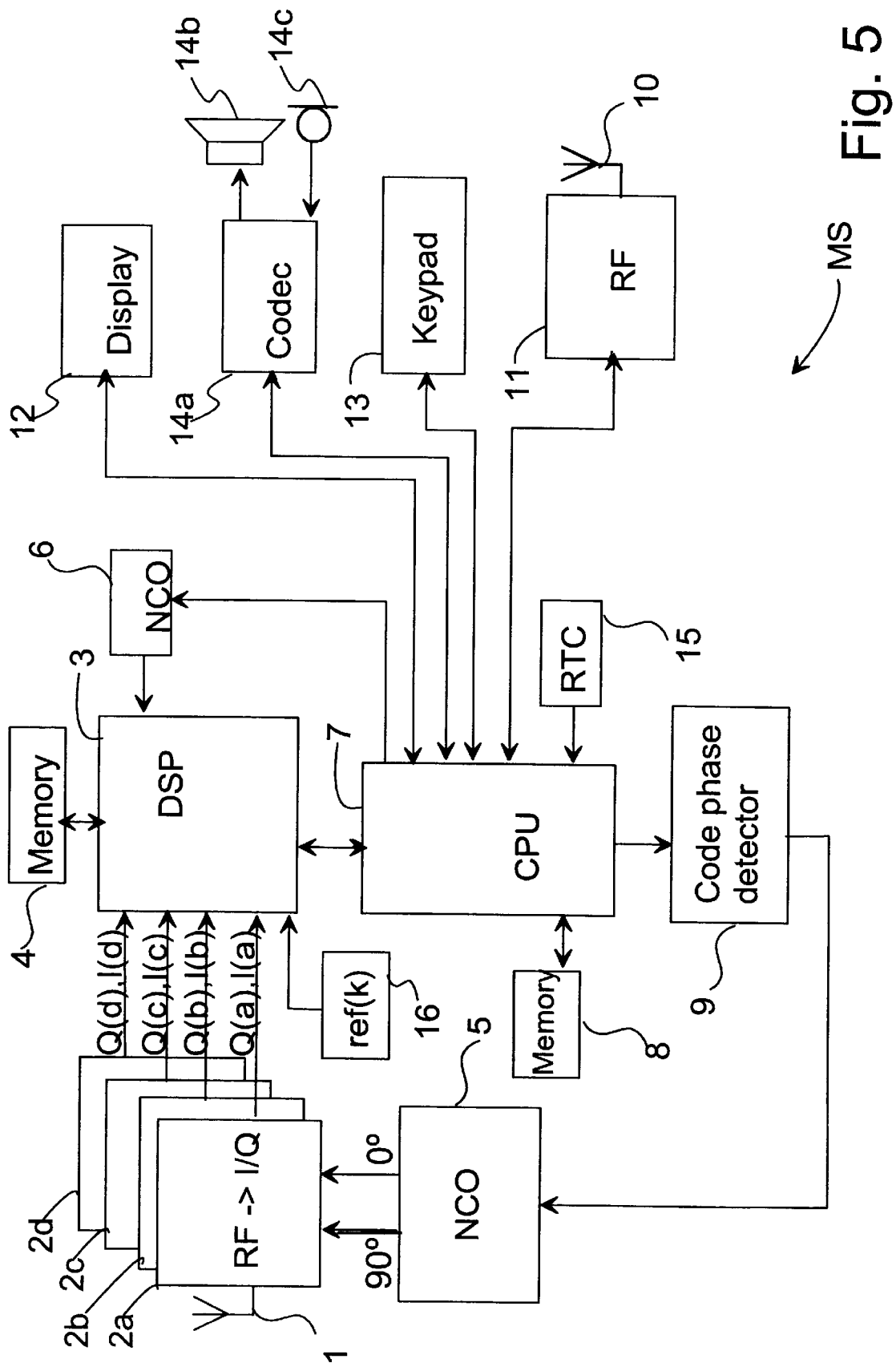

In the following, the invention will be described in more detail with reference to the appended drawings, in which FIG. 1a illustrates, in a simplified principle view, positioning in a communication network by means of a signal transmitted by four satellites and a reference receiver, FIG. 1b illustrates, in a simplified principle view, positioning in a positioning receiver by means of a signal transmitted by four satellites and a reference receiver, FIG. 2 shows an example of a frame structure used in the GPS system, FIG. 3 illustrates the formula of prior art, and its different terms, used for estimating the moment of transmission of a signal received at the moment of positioning, FIG. 4 shows the distance between a satellite and a positioning receiver and a base station in the time plane, and FIG. 5 shows, in a simplified block chart, a receiver in which the method according to the invention can be applied.

DETAILED DESCRIPTION OF THE INVENTION

In a positioning receiver MS of FIG. 5, a signal to be received via a first antenna 1 is converted preferably to an intermediate frequency or directly to a baseband frequency in converter blocks 2a–2d. The receiver MS of FIG. 5 comprises four receiving channels, each having a separate converter block 2a–2d, but it is obvious that there can be a different number of channels than is presented here. The signal, converted to the intermediate frequency or the baseband frequency in the converter blocks 2a–2d, comprises two components, known as such: the I and Q components which have a phase difference of 90 degrees. These analog signal components, converted to the intermediate frequency, are digitized. In the digitization, at least one sample is taken of each chip in the signal components; that is, in the GPS system, at least 1,023,000 samples are taken in a second. Furthermore, the I and Q components of the digitized signal are multiplied with the signal formed by a first numerically controlled oscillator 5 (NCO). This signal of the first numerically controlled oscillator 5 is intended to correct a frequency deviation due to the Doppler effect or a frequency error in the local oscillator of the receiver (not shown). The signals generated in the converter blocks 2a–2d are indicated in FIG. 5 with references Q(a),I(a)–Q(d),I(d) are preferably led to a digital signal processing unit 3. Reference codes ref(k) corresponding to the codes used in the code modulation of the satellites to be received at a time are also generated in block 16. The receiver MS tends to use e.g. this reference code ref(k) to find out the code phase and frequency deviation of the signal of the satellite to be received on each receiving channel, to be used in operations after synchronization.

A control block 7 is used to control e.g. a code phase detector 9, by means of which the frequency of the numerically controlled oscillator 5 is adjusted, when necessary. The synchronization is not discussed in more detail in this description, but it is prior art known as such. After the receiving channel has been synchronized with the signal of any satellite SV1, SV2, SV3, SV4, it is possible to start the detection and storage of the navigation information transmitted in the signal can be started, when necessary. The digital signal processing unit 3 stores the navigation information preferably in a memory 4. In the method according to a first preferred embodiment of the present invention, this navigation information does not need to be detected and stored, but the positioning receiver MS must determine the chip and code phase of the signals received from the satellites.

The positioning receiver MS also comprises means for performing the operations of a mobile station, such as a second antenna 10, a radio part 11, audio means, such as a codec 14a, a speaker 14b, and a microphone 14c, a display 12, and a keypad 13.

The determination of the chip and code phase is preferably performed substantially simultaneously for all the receiving channels, wherein the moment of receiving a signal is substantially the same on each receiving channel. The positioning receiver MS transmits the determined chip and code phase information of the satellites via the base station BS to the communication network preferably either after the determination, when the computing server requests for chip and code phase information, or upon initiation by a positioning command or the like, entered by the user.

When one wishes to perform positioning, it is examined preferably in the computing server S if the necessary navigation information is available in the computing server S. If there is no navigation information or it is insufficient, the computing server S preferably examines what required navigation information is not available in the computing server S at the time.

If the missing information is chip and code phase information of the positioning receiver MS, the computing server S requests the positioning receiver MS to transmit the chip and code phase information. This can be performed e.g. in such a way that the computing server S transmits a request to the communication network, e.g. via a mobile switching center MSC to the base station, which transmits the request further to the positioning receiver MS.

If the missing information is Ephemeris data on the satellites or other information related to the location and/or time of the satellites, the computing server S requests the communication network to transmit the missing information. This information can be transmitted e.g. from a control center for the satellite positioning system (not shown).

When there is sufficient navigation information available at the computing server S, the moment of transmission of the received signals is preferably calculated on the basis of the formula 1. However, if there is not sufficiently navigation information received, in the method according to a preferred embodiment of the invention, the moment of transmission of the received signals is determined on the basis of the number $N_{chip}^k$ and code phase $\Delta chip^k$ of chips received after the change of the code phase of the received signal, as well as the navigation information in the computing server S.

In principle, the position can be calculated by several different methods, but only one method is presented herein: the method of least mean squares (LMS). For simplicity, some basic operations, such as removal of satellite SV1, SV2, SV3, SV4 clock bias, ionosphere correction, etc. are disregarded in this context. Furthermore, it is assumed that previous positioning data is not available in the receiver and that all measurements are performed at the same moment, i.e. sampling is performed parallelly at the same moment on each receiving channel. The received signals are stored in a memory, wherein their further processing can be performed at different times.

In the following, the operation of the method according to a first preferred embodiment of the invention will be described with reference to the FIGS. 1a, 3 and 4. At this stage, it is assumed that a reference clock 15 is relatively accurate and frequency stable. This reference clock is formed by e.g. the real-time clock (RTC) of the receiver MS, or it can also be formed by an external clock (not shown), or the time data can be obtained from an external network, such as the mobile communication network.

According to the formula (1), the determination of the transmission time ToT comprises five elements, of which only the last two, i.e. the number $N_{chip}^k$ and code phase $\Delta chip^k$ of chips received after the change of the code phase can be determined in a situation in which the strength of the signal to be received is low. These two parameters can only be used to measure differences on the chip level (<1 ms) in signals of different satellites SV1, SV2, SV3, SV4, because the same code is repeated at intervals of one code phase (=1 ms). Since the distance between each satellite and the receiver can vary to a significant extent, the propagation times of signals received from different satellites can differ greatly, even more than 10 ms. Thus, the determination of differences on the chip level is not sufficient. One millisecond in time means a distance of about 300 km the signal propagating substantially at the speed of light. Correspondingly, one chip (about 1 µs=1 ms/1023) means about 300 metres.

In such a situation, the differences in milliseconds on the different receiving channels must be determined on the basis of the distances between the satellites SV1, SV2, SV3, SV4 and the receiver MS. In a general case, however, the estimated position of the receiver MS is not necessarily known. Instead, in the system of FIGS. 1a and 1b, the position of the receiver MS can be estimated by means of the position of a selected reference point, such as a base station BS. Thus, information on the position of the reference point, the Ephemeris data of the satellites SV1, SV2, SV3, SV4, and time data can be transmitted from the base station BS to the computing server S. In the GSM mobile communication system, the distance between a mobile station and the base station with which the mobile station communicates at a time, is normally not more than about 30 km. Thus, it can be assumed that the receiver MS is within this radius of 30 km from the location of the base station BS. Thus, the propagation time of the signal transmitted by a satellite to the base station (indicated with reference D1 in FIG. 4) and the propagation time from the satellite to the positioning receiver (indicated with reference D2 in FIG. 4) differ not more than about 100 µs. Furthermore, the distance between the positioning receiver MS and the base station BS, in view of the propagation times, does not change significantly in the range of the base station BS, wherein it can be assumed that there is a difference of less than one millisecond in the moments of receiving the signal of the same satellite in the positioning receiver and in the base station BS. This is illustrated in the appended FIG. 4. Thus, the distance can be calculated with an accuracy of one millisecond in the following way:

$$\hat{N}_{ms}^k = \lfloor \|\bar{x}_{SV}^k - \bar{x}_u\| \rfloor \times 1000 \text{ ms/c} \qquad (2)$$

in which the marking $\lfloor . \rfloor$ indicates rounding off to the closest integer, and the line above the variable indicates that it is a vector. Thus, the same result is obtained in view of both the base station BS and of the positioning receiver MS. An estimate of the GPS time $\hat{T}_{GPS}$ is transmitted from the base station BS to the calculating server S. If this GPS time data is very accurate, it is also possible to calculate the position of the satellites very accurately, wherein errors can be caused in the positioning primarily by the distance between the positioning receiver MS and the base station BS, which is not necessarily known.

After a calculation in milliseconds of the distance $\hat{N}_{ms}^{k}$ according to Formula 2 has been performed for all the receiving channels, the moments of transmission of the signals can be estimated on the basis of the following formula.

$$\hat{T}_{ToT}^{k}=T_{GPS}-\hat{N}_{ms}^{k}-N_{chip}^{k}-\Delta chip^{k} \qquad (3)$$

The measured value of the moment of transmission of the signal from any satellite can be selected as the reference time. After this, the satellite time at the moment of receiving the signal, i.e. the GPS time, $\hat{T}_{GPS}$, can be estimated by adding an estimated transmission delay, i.e. the time of propagation of the signal from the satellite to the receiver, to the transmission time ToT obtained on the basis of the measurement selected as the reference time. An estimate normally used for the transmission delay is 70 ms.

$$\hat{T}_{GPS}=\hat{T}_{ToT}^{k}+0.070 \qquad (4)$$

After the preliminary determination of the GPS time, the measured pseudoranges can be determined by reducing the calculated signal transmission moments from the estimate of the GPS time and by multiplying the result with the speed of light in the following way:

$$\rho_{m}^{k}=(\hat{T}_{GPS}-\hat{T}_{ToT}^{k})c \qquad (5)$$

in which c indicates the speed of light in a vacuum, the superscript k indicates the satellite from whose signal the measured value is derived (e.g. 1 to 4), and the subindex m indicates that the pseudorange in question is measured, not estimated.

The estimated pseudoranges are calculated with respect to the position $\bar{x}_{u}$ of the receiver of the user as well as to the positions $\bar{x}_{SV}^{k}(\hat{T}_{GPS})$ of the satellites at the estimated moment of transmission ToT. As the user's default position is selected the position of the base station BS with which the mobile station communicates at the time. The positions of the satellites are calculated as a function of time by means of equations known as such. In this context, for simplicity, these estimated pseudoranges are presented with the following formula:

$$\rho_{p}^{k}=f(\hat{T}_{GPS},\bar{x}_{u}) \qquad (6)$$

to indicate that the estimated pseudoranges are only based on the estimated GPS time and the estimated position of the user. In the formula (6), the term f indicates a (strongly) non-linear function, the subindex p indicates that it is an estimate in question, and $\bar{x}_{u}$ is the estimated position of the user, in which the line above the variable indicates that it is a vector.

The position $\bar{x}_{u}$ of the user as well as the difference between the estimated GPS time and the real GPS time can be calculated for example by the method of least mean squares by iteration. This method is known as such. In the method of least mean squares, the following set of equations is solved:

$$\rho_{m}^{k}=\|\bar{x}_{SV}^{k}-\bar{x}_{u}\|+ct_{u}, k=1 \ldots M \qquad (7)$$

The aim is to find a position data $\bar{x}_{u}$ and a time error $\Delta t_{u}$ that are most suitable for M number of measurements. The solution of this set of equations is linear as such:

$$\begin{bmatrix} \Delta \bar{x}_{u} \\ \Delta t_{u} \end{bmatrix} = (H^{T}H)^{-1}H^{T}\Delta \bar{\rho} \qquad (8)$$

in which $$\Delta \bar{\rho}=\bar{\rho}_{m}^{k}-\bar{\rho}_{p}^{k}, k=1 \ldots M \qquad (9)$$

$\Delta \bar{x}_{u}$ is a position correction vector, $\Delta t_{u}$ is time error correction, and H is the linearized Jacobian matrix of estimated pseudoranges at point $\bar{x}_{u}$.

The solution provided by the method of the least mean squares is optimal in view of the sum of squared errors (SSE). This sum of squared errors can be estimated with the formula:

$$SSE \cong \left( \Delta \bar{\rho} - H \begin{bmatrix} \Delta \bar{x}_{u} \\ \Delta t_{u} \end{bmatrix} \right)^{T} \left( \Delta \bar{\rho} - H \begin{bmatrix} \Delta \bar{x}_{u} \\ \Delta t_{u} \end{bmatrix} \right) \qquad (10)$$

By rearranging the terms and using slightly different expressions for the terms, the formula (7) can be written as follows:

$$\rho_{m}^{k}(T_{GPS})=\|\bar{x}_{SV}^{k}(\hat{T}_{GPS})-\bar{x}_{u}\|+ct_{u}, k=1 \ldots M \qquad (11)$$

The brackets indicate that the term is based on the parameter presented in the brackets. Using such a presentation, it can be clearly seen that the measured pseudoranges are functions of true GPS time, the rest being functions of estimated GPS time. Thus, it is possible to calculate the time difference between the estimated GPS time and the true GPS time on the basis of the measurements, and thus it is also possible to synchronize the receiver with the real GPS time. The time error of the receiver can be presented here as a time difference according to the following formula:

$$\Delta t_{u} \cong \Delta T = T_{GPS} - \hat{T}_{GPS} \qquad (12)$$

in which $\Delta t_{u}$ is the estimated (or calculated) chronometric error and $\Delta T$ is the real chronometric error between the estimated time $\hat{T}_{GPS}$ and the true GPS time $T_{GPS}$.

Now, this time difference can be utilized in the computing server S to correct the estimated GPS time, after which it is possible to recalculate the positions of the satellites to obtain better positioning particularly in a situation in which the calculated time difference was significantly great.

The calculation of the distance, as presented in the formula 2 above, may in some cases cause rounding-off errors. For example, if the calculated distance in milliseconds before rounding off is close to the next integer and the receiver MS is close to the base station BS, this may result in an error of almost one millisecond. This may cause an error of even 300 km in the calculation of the distance between the receiver and the satellite, which will distort the positioning of the receiver to a significant extent. In some cases, this error can be detected in the height data calculated for the position of the receiver, which indicates that the receiver is at a height of tens of kilometres or deep down in the earth. Thus, the error can be easily detected. However, this is not always the case. The method according to a preferred embodiment of the invention utilizes the information that the receiver MS is close to the base station BS whose position is known at a sufficient accuracy. Thus, it is possible to set the limits within which the position data to be calculated for the receiver MS should be. This limit is, in the direction of the earth surface, for example a circle with its centre at the base station and having a radius of about 30 km. In a corresponding manner, suitable limit values can be set in the height direction. If the calculation yields position data for the receiver MS which is outside said limits, it can be assumed that an error has been caused by rounding off. After this, it is determined in the computing server S, at which satellite/satellites this error has occurred. This can be performed by examining the remainders of the values calculated with the formula 2.

This method can be used to quickly detect possible errors caused by rounding off and to perform the necessary correction operations. Another method to detect rounding-off errors is to examine error values calculated with the formula 9, and if any value is clearly different from the other values (significantly higher), an error has been probably caused by rounding-off in the calculation of the distance of the satellite corresponding to the value.

After this, the positioning information can be transmitted to the positioning receiver MS, in which the position can be displayed to the user. For example in the case of an emergency call, the positioning information is substantially immediately available in the communication network, e.g. at the mobile switching center MSC, even though this information were not transmitted to the positioning receiver. This will speed up the forwarding of aid to the correct location.

Consequently, it is a basic idea of network-based positioning to implement all the demanding computing in a computing server S or a corresponding device located in a communication network. The function of the receiver MS is thus primarily to measure the signals of the satellites and in some cases to preprocess them. After this, the receiver MS transmits the signals to the computing server S to calculate the actual position.

In the network-based positioning, the receiver MS comprises, in a minimum, of only the equipment required for taking the chip and code phase measurements and for transmitting them via the network to the server. In this case, the receiver MS does not necessarily need even time data.

In a method according to a second preferred embodiment of the invention, the computing required in the positioning is performed in the positioning receiver MS. Thus, the most substantial differences to the method according to the first preferred embodiment of the invention is that e.g. the GPS time data and the Ephemeris data are transmitted to the positioning receiver MS instead of the computing server S.

After the receiving channel of the positioning receiver MS has been synchronized to the signal of a satellite SV1, SV2, SV3, SV4, it is possible to start the detection and storage of the navigation information transmitted in the signal can be started, when necessary. The digital signal processing unit 3 stores the navigation information preferably in a memory 4.

The detection and storage are preferably performed substantially simultaneously for all the receiving channels, wherein the moment of receiving the signal received is substantially the same on each receiving channel. When one wishes to perform positioning, it is examined preferably in the digital signal processing unit 3, if the necessary navigation information has been received If there is sufficient navigation information stored in the memory 5, the moment of the transmission of the received signals is preferably calculated on the basis of the formula 1. However, if not sufficient navigation information has been received, in the method according to this second preferred embodiment of the invention, the moment of transmission of the received signals is determined on the basis of the number $N_{chip}^k$ and code phase $\Delta chip^k$ of chips received after the change of the code phase of the received signal, as well as the navigation information transmitted via the base station and received in the positioning receiver MS, as has been described above in connection with the description of the first preferred embodiment of the method according to the invention.

It has been assumed above that the reference chronometer to be used in the receiver MS is accurate. However, in practical applications, the accuracy of the real-time clock RTC of the receiver may vary. In a corresponding manner, the time data to be transmitted from the base station BS of the mobile communication network and to be received at the receiver MS can be delayed to a significant extent. However, this delay is not known to the receiver and, moreover, the delay may vary at different times of transmission of the time data. Also, if the receiver is not capable of decoding the information transmitted in the navigation message, the receiver cannot obtain information about the GPS time. An incorrect GPS time estimate may cause even significant errors in the positioning. Effects and elimination of the GPS time data are described in more detail in a parallel patent application by the applicant, which is incorporated herein by reference.

In the above-described example, a base station BS was used as a reference point; however, it is obvious that also another point whose location is known with some accuracy can be selected as the reference point. Thus, this reference point is used as a default position for the receiver in the positioning.

The invention can also be applied in such a system which utilizes e.g. a mobile communication system in addition with positioning by means of satellites. It is thus possible to use three or more base stations BS, BS', BS" of a mobile communication system, whose locations are known, to determine the position of a receiver MS at an accuracy which is typically slightly poorer than GPS positioning, by using propagation time measurement functions of the mobile communication system to determine the propagation time of a signal from the base station to the receiver. By means of the propagation time measurements, it is possible to determine the distance of the receiver MS from the different base stations in time, wherein the position of the mobile station MS can be determined.

Another alternative is to determine the angles of arrival (AOA) $\alpha$, $\alpha'$, $\alpha''$ of the signal from the mobile station MS to two or more base stations BS, BS', BS" and to transmit this information on the determined angles of arrival of the signal to the receiver MS. Thus, the orientation of the receiver MS in view of at least two base stations BS, BS', BS" can be determined on the basis of these angles of arrival of the signal, wherein said reference point to be selected can be the location of the receiver as calculated on the basis of said orientations.

Yet another alternative is, for example, to determine both the propagation time and the angle of arrival ($\alpha$, $\alpha'$, $\alpha''$) of the signal from the mobile station to at least one base station BS, BS', BS" and to transmit these determined propagation time and angle of arrival data to a computing device, such as a computing server S or the receiver MS. Thus, it is possible to determine the orientation and the distance d, d', d" of the mobile station MS with respect to at least one base station BS, BS', BS" on the basis of the propagation time and the angle of arrival of the signal, wherein said reference point to be selected can be the location of the receiver as calculated on the basis of the distance d, d', d" and the angle of arrival.

This arrangement can be utilized for example when it is not possible to receive a signal transmitted by satellites at the receiver MS, or the signal strength is so low that measurements cannot be made on the chip level. Thus, in a situation in which satellite positioning can be used again, the reference point to be selected can be e.g. the position of the receiver MS determined on the basis of said base stations.

To perform the computations presented above, in the method according to the first preferred embodiment of the invention, the application software of the computing server S is provided with the necessary program commands in a way known as such.

The computing server S can be arranged e.g. in connection with a mobile switching center MSC, wherein data transmission between the communication network, in this case a mobile communication network, and the computing server S is performed via the mobile switching center MSC. It is obvious that the computing server S can also be coupled to communicate with the communication network in a way known as such.

In the method according to the second preferred embodiment of the invention, the calculations presented above are preferably performed in the digital signal processing unit 3 and/or in the control block 7. For this purpose, the application software is provided with the necessary program commands in a way known as such. The results of the calculations, and possible intermediate results needed, are stored in a memory 4, 8. After the positioning, the determined position of the positioning receiver can be preferably displayed on the display 12 e.g. in coordinate format. Also, map information on the area in which the user's positioning receiver MS is located at the time can be displayed on the display 12. This map information can be loaded i.e. via the mobile communication network preferably in such a way that the determined location data are transmitted from the mobile station functions of the positioning receiver MS to the base station BS which transmits them further for processing, e.g. to a mobile switching centre (not shown). If necessary, the mobile communication network contacts, i.e. via the Internet network, a server (not shown) containing map information of the area in question. After this, the map information is transmitted via the mobile communication network to the base station BS and further to the positioning receiver MS.

Although the invention has been described above in connection with a positioning receiver MS, it is obvious that the invention can also be applied in electronic devices of other types, having means for positioning the electronic device. Thus, these means for positioning the electronic device comprise a positioning receiver MS according to a preferred embodiment of the invention.

The invention can also be applied in connection with other wireless data transmission networks than mobile communication networks. Thus, the location of a known point in the vicinity of the positioning receiver can be received via the wireless data transmission network.

It is obvious that the present invention is not limited solely to the embodiments presented above, but it can be modified within the scope of the appended claims.

What is claimed is:

1. A method for positioning a receiver (MS) in positioning means (S, MS), in which method a code modulated signal transmitted by satellites (SV1–SV4) and formed by an individual code for each satellite (SV1–SV4) is received, characterized in that in the method, at least one reference point (BS) is selected, whose positioned is substantially known, that information is transmitted to the positioning means (S, MS) about the position of said at least one reference point and about position information on the satellites (SV1–SV4), wherein at least the position information on each of the satellites (SV1–SV4) to be used in the positioning and the location of said at least one reference point are used in the positioning of the receiver, and the position of said reference point (BS) is used as the default position of the receiver (MS).

2. The method according to claim 1, characterized in that in the method first distances ($\rho_m^k$) between the satellite (SV1–SV4) and said reference point are determined by determining the moment of transmission ($\hat{T}_{ToT}^k$) of the signal received from each satellite used in the positioning, and by determining estimated time data ($\hat{T}_{GPS}$) at the moment of receiving the signal, second distances ($\rho_p^k$) between the satellite (SV1–SV4) and said reference point are estimated by determining the location of each satellite (SV1–SV4) used in the positioning at the moment of transmission of the signal on the basis of said estimated time data ($\hat{T}_{GPS}$) and position information, and the position ($\tilde{X}_u$) of the receiver (MS) as well as the difference between the estimated GPS time ($\hat{T}_{GPS}$) and the real GPS time ($T_{GPS}$) are calculated at least partly on the basis of said first distances ($\rho_m^k$) and said second distances ($\rho_p^k$).

3. The method according to claim 2, characterized in that in the method, the distances are calculated in time units at a predetermined accuracy, wherein when the value ($\hat{N}_{ms}^k$) calculated for the distance is between two values corresponding to the selected accuracy, the value ($\hat{N}_{ms}^k$) calculated for the distance is rounded to one of said values corresponding to the accuracy.

4. The method according to claim 3, characterized in that the code to be used in the modulation is formed of a set of chips, wherein a signal modulated with said set of chips constitutes a code sequence which is iterated in the code modulation, that a reference code (ref(k)) corresponding to the individual code of each satellite is used in the receiver (MS) to determine a change in the code sequence and the code phase ($\Delta\text{chip}^k$), wherein the number ($N_{chip}^k$) and code phase ($\Delta\text{chip}^k$) of chips received after the change in the code sequence preceding the moment of positioning are determined in the receiver (MS), wherein the moment ($\hat{T}_{ToT}^k$) of transmission of the signal is determined in the following way:

$$\hat{T}_{ToT}^k = T_{GPS} - \hat{N}_{ms}^k - N_{chip}^k - \Delta\text{chip}^k.$$

5. The method according to claim 3, characterized in that the accuracy to be used in the determination of the distance ($\hat{N}_{ms}^k$) between each satellite (SV1–SV4) and said reference point is selected to be 1 ms.

6. The method according to claim 3, characterized in that in the method, at least one limit value (r, h) is set as the maximum distance between the receiver (MS) and said reference point (BS), wherein if the position determined for the receiver (MS) is further away than the maximum distance from the reference point, it is examined which calculated distance value ($\hat{N}_{ms}^k$) has been rounded to cause that the maximum distance is exceeded, wherein this distance value is changed by rounding it to the other of said two values corresponding to the accuracy.

7. The method according to claim 1, characterized in that said reference point is a base station (BS) of a mobile communication network, and that information about the position of the reference point and the position information on the satellites (SV1–SV4) are transmitted to the positioning means (S, MS).

8. The method according to claim 7, characterized in that in the method, also the time of propagation of the signal from the mobile station (MS) to three or more base stations (BS, BS', BS") is determined, and that said propagation time data is transmitted to the receiver (MS) to determine the distance (d, d', d") in time to at least three base stations (BS, BS', BS"), wherein the position of the receiver calculated on the basis of said distances (d, d', d") is selected as said reference point.

9. The method according to claim 7, characterized in that in the method, also the angle of arrival ($\alpha$, $\alpha'$, $\alpha''$) of the signal from the mobile station (MS) to two or more base stations (BS, BS', BS") is determined, and that said angle of arrival data ($\alpha$, $\alpha'$, $\alpha''$) are transmitted to the positioning means (S, MS) to determine the orientation of the receiver (MS) from at least three base stations (BS, BS', BS"), wherein the position of the receiver (MS) determined on the basis of said orientations is selected as said reference point.

10. The method according to claim 7, characterized in that in the method, also the time of propagation and the angle of arrival ($\alpha$, $\alpha'$, $\alpha''$) of the signal from the mobile station (MS) to at least one base station (BS, BS', BS") are determined, and that said signal propagation time and angle of arrival data ($\alpha$, $\alpha'$, $\alpha''$) are transmitted to the positioning means (S, MS) to determine the orientation and distance (d, d', d") of the receiver (MS) from at least one base station (BS, BS', BS"), wherein the position of the receiver (MS) determined on the basis of said orientation and distance (d, d', d") is selected as said reference point.

11. The method according to claim 1, characterized in that in the positioning, the signals transmitted from at least four satellites (SV1–SV4) are used.

12. The method according to claim 1, characterized in that the satellites (SV1–SV4) used are satellites of the GPS system.

13. The method according to claim 1, characterized in that the positioning means (S, MS) used is a computing server (S), wherein a data transmission connection is set up between the computing server (S) and the receiver (MS).

14. The method according to claim 1, characterized in that the positioning means (S, MS) used is the receiver (MS).

15. A positioning system which comprises at least positioning means (S, MS) and a receiver (MS) comprising means (1, 2a–2d) for receiving a code modulated signal transmitted by satellites (SV1–SV4), the code modulated signal being formed by an individual code for each satellite (SV1–SV4), characterized in that the positioning means (S, MS) also comprises means (S, 10, 11) for receiving position data on at least one selected reference point (BS) whose position is substantially known, means (S, 10, 11) for receiving position information of the satellites (SV1–SV4), and means (S, 3) for determining the position of the receiver on the basis of at least the position information and the position of said at least one reference point (BS), and the position of said reference point (BS) is used as the default position of the receiver (MS).

16. The positioning system according to claim 15, characterized in that the positioning system also comprises:
means (3, 4) for determining the moment of transmission ($\hat{T}_{ToT}^k$) of the signals received from the satellites used in the positioning, and
means (3, 10, 11) for determining estimated time data ($\hat{T}_{GPS}$) at the moment of receiving the signal, means (3) for determining first distances ($\rho_m^k$) between the satellite (SV1–SV4) and said reference point on the basis of said signal transmission moment ($\hat{T}_{ToT}^k$) and estimated time data ($\hat{T}_{GPS}$),
means (3) for estimating second distances ($\rho_p^k$) between the satellite (SV1–SV4) and said reference point by determining the position of each satellite (SV1–SV4) used in the positioning at the moment of transmission of the signal on the basis of said estimated time data ($\hat{T}_{GPS}$) and the position information, and
means (3) for calculating the position ($\bar{X}_u$) of the receiver (MS) as well as the difference between the estimated GPS time ($\hat{T}_{GPS}$) and the real GPS time ($T_{GPS}$) at least partly on the basis of said first distances ($\rho_m^k$) and second distances ($\rho_p^k$).

17. The positioning system according to claim 16, characterized in that the distances are calculated in time units at a predetermined accuracy, wherein when the value ($\hat{N}_{ms}^k$) calculated for the distance is between two values corresponding to the selected accuracy, the value ($\hat{N}_{ms}^k$) calculated for the distance is rounded to one of said two values corresponding to the accuracy.

18. The positioning system according to claim 17, characterized in that the code used in the modulation is formed of a set of chips, wherein a code sequence is formed of a signal modulated with said set of chips which is iterated in the code modulation, that the receiver (MS) comprises means (16) for forming a reference code, means for determining the number ($N_{chip}^k$) and code phase ($\Delta chip^k$) of chips received after a change in the code sequence preceding the moment of positioning on the basis of said reference code, wherein the number ($N_{chip}^k$) and code phase ($\Delta chip^k$) of the chips received after the change of the code phase preceding the moment of the positioning is arranged to be determined in the receiver (MS), wherein the moment of transmission ($\hat{T}_{ToT}^k$) of the signal is determined in the following way:

$$\hat{T}_{ToT}^k = T_{GPS} - \hat{N}_{ms}^k - N_{chip}^k - \Delta chip^k.$$

19. The positioning system according to claim 17, characterized in that the accuracy to be used in determining the distance ($\hat{N}_{ms}^k$) between each satellite (SV1–SV4) and said reference point is selected to be 1 ms.

20. The positioning system according to the claim 17, characterized in that at least one limit value (r, h) is set in the positioning means (S, MS) as the maximum distance between the receiver (MS) and said reference point (BS), wherein the positioning means (S, MS) comprises means (3, 7) for comparing the determined distance with said limit value (r, h), means (3, 7) for examining which calculated distance value ($\hat{N}_{ms}^k$) has been rounded to cause that the maximum distance is exceeded, if the position determined for the receiver (MS) is further away than said maximum distance from the reference point, wherein this distance value is arranged to be changed by rounding it to the other of said two values corresponding to the accuracy.

21. The positioning system according to claim 15, characterized in that said reference point is a base station (BS) of a mobile communication network, and that information about the position of said reference point and the position information on the satellites (SV1–SV4) are transmitted via said base station (BS) to the positioning means (S, MS).

22. The positioning system according to claim 21, characterized in that the positioning means (S, MS) also comprise means for receiving propagation time data, which propagation time data are measured to determine the distances (d, d', d") in time between the receiver (MS) and at least three base stations (BS, BS', BS"), means for determining the position of the receiver (MS) on the basis of said propagation time data, wherein said reference point is selected to be the position of the receiver calculated on the basis of said distances (d, d', d").

23. The positioning system according to claim 15, characterized in that the signals transmitted by at least four satellites (SV1–SV4) are used in the positioning.

24. The positioning system according to claim 15, characterized in that the received signals are signals transmitted by satellites of the GPS system.

25. The positioning system according to claim 15, characterized in that it comprises means (10, 11, 12, 13, 14a, 14b, 14c) for performing mobile station functions.

26. The positioning system according to claim 15, characterized in that the positioning means (S, MS) comprise a computing server (S), wherein a data transmission connection is arranged to be set up between the computing server (S) and the receiver (MS).

27. The positioning system according to claim 15, characterized in that the positioning means (S, MS) are arranged in the receiver (MS).

28. An electronic device (MS) which is arranged to be used in a positioning system with positioning means, and which electronic device also comprises at least means (1, 2a–2d) for receiving a code modulated signal transmitted by satellites (SV1–SV4), the code modulated signal being formed with an individual code for each satellite (SV1–SV4), the code modulated signal being formed with an individual code for each satellite (SV1–SV4), characterized in that the electronic device (MS) also comprises means (10, 11) for determining the number ($N_{chip}^{k}$) and code phase ($\Delta chip^{k}$) of chips received after a change in the code sequence preceding the moment of positioning on the basis of said reference code, and means for transmitting the chip number data and the code phase data to said positioning means, wherein the positioning means also comprise means for receiving position data of at least one selected reference point whose position is substantially known, means for receiving position information of the satellites, and means for positioning the receiver on the basis of at least said position information of the satellites and the position of said at least one reference point, and the position of said reference point (BS) is used as the default position of the receiver (MS).

29. A computing server (S) comprising at least positioning means (S, MS) for positioning a receiver (MS), the receiver (MS) comprising means (1, 2a–2d) for receiving a code modulated signal transmitted by satellites (SV1–SV4), the code modulated signal being formed with an individual code for each satellite (SV1–SV4), characterized in that the positioning means (S, MS) also comprise means (S, 10, 11) for receiving the position data of at least one selected reference point (BS) whose position is substantially known, means (S, 10, 11) for receiving position information on the satellites (SV1–SV4), and means (S, 3) for positioning the receiver on the basis of at least said position information and the position of said at least one reference point (BS), and the position of said by reference point (BS) is used as the default position of the receiver (MS).

\* \* \* \* \*

UNITED STATES PATENT AND TRADEMARK OFFICE
CERTIFICATE OF CORRECTION

PATENT NO. : 6,476,762 B2
DATED : November 5, 2002
INVENTOR(S) : Valio et al.

It is certified that error appears in the above-identified patent and that said Letters Patent is hereby corrected as shown below:

Column 4,

Line 10, "$\hat{T}_{TOT}{}^k$" should read -- $\hat{T}^k_{ToT}$ --.

Line 13, "$\hat{T}_{TOT}{}^k = TOW^k + N_{bit}{}^k + N_{ms}{}^k + N_{chip}{}^k + \Delta chip^k$" should read -- $\hat{T}^k_{ToT} = TOW^k + N^k_{bit} + N^k_{ms} + N^k_{chip} + \Delta chip^k$ --.

Line 17, "$N_{bit}{}^k$" should read -- $N^k_{bit}$ --.

Line 21, "$N_{ms}{}^k$" should read -- $N^k_{ms}$ --.

Line 23, "$N_{chip}{}^k$" should read -- $N^k_{chip}$ --.

Column 8,

Line 15, "$N_{chip}{}^k$" should read -- $N^k_{chip}$ --.

Line 62, "$\hat{N}_{ms}{}^k = \lfloor \| \overline{x}_{sv}{}^k - x_u \| \rfloor \times 1000 \text{ ms/c}$" should read -- $\hat{N}^k_{ms} = \left[ \frac{\| \overline{x}^k_{sv} - \overline{x}_u \|}{c} \right] \times 1000 ms$ --.

Column 9,

Line 9, "$\hat{N}_{ms}{}^k$" should read -- $\hat{N}^k_{ms}$ --.

Line 14, "$\hat{T}_{ToT}{}^k = T_{GPS} - \hat{N}_{ms}{}^k - N_{chip}{}^k - \Delta chip^k$" should read -- $\hat{T}^k_{ToT} = T_{GPS} - \hat{N}^k_{ms} - N^k_{chip} - \Delta chip^k$ --.

Line 24, "$\hat{T}_{GPS} = \hat{T}_{ToT^k} + 0.070$" should read -- $\hat{T}_{GPS} = \hat{T}^k_{ToT} + 0.070$ --.

Line 30, "$\rho_m{}^k = (\hat{T}_{GPS} - \hat{T}_{ToT}{}^k)c$" should read -- $\rho^k_m = \left(\hat{T}_{GPS} - \hat{T}^k_{ToT}\right)c$ --.

Line 37, "$X_u$" should read -- $\overline{\hat{x}}_u$ --.

Line 38, "$\overline{x}_{sv}{}^k(\hat{T}_{GPS})$" should read -- $\overline{x}^k_{sv}(\hat{T}_{GPS})$ --.

Line 46, "$\rho_p{}^k = f(\hat{T}_{GPS}, -x_u)$" should read -- $\rho^k_p = f(\hat{T}_{GPS}, \overline{x}_u)$ --

UNITED STATES PATENT AND TRADEMARK OFFICE
CERTIFICATE OF CORRECTION

PATENT NO. : 6,476,762 B2
DATED : November 5, 2002
INVENTOR(S) : Valio et al.

It is certified that error appears in the above-identified patent and that said Letters Patent is hereby corrected as shown below:

Column 9 (cont'd),

Lines 51 and 54, "$x_u$" should read -- $\overline{\hat{x}}_u$ --.

Line 60, "$\rho_m^k = \|x_{SV}^k - \overline{x}_u\| + ct_u, k = 1...M$" should read -- $\rho_m^k = \|\overline{x}_{SV}^k - \overline{\hat{x}}_u\| + ct_u, k = 1...M$ --.

Column 10,
Lines 1 and 10, "$x_u$" should read -- $\overline{\hat{x}}_u$ --.

Line 6, "$\Delta\overline{\rho} = \overline{\rho}_m^k - \overline{\rho}_p^k, k = 1...M$" should read -- $\Delta\overline{\rho} = \overline{\rho}_m^k - \overline{\rho}_p^k, k = 1...M$ --.

Line 7, "$\Delta \overline{X}_u$" should read -- $\Delta\overline{\hat{x}}_u$ --.

Line 19, "$\rho_m^k(T_{GPS}) = \|x_{SV}^k(\hat{T}_{GPS}) - \overline{x}_u\| + ct_u, k = 1...M$" should read
-- $\rho_m^k(\hat{T}_{GPS}) = \|\overline{x}_{SV}^k(\hat{T}_{GPS}) - \overline{\hat{x}}_u\| + ct_u, k = 1...M$ --.

Column 14,

Line 13, "$(\rho_m^{\cdot k})$" should read -- $(\rho_m^k)$ --.

Lines 15 and 46, "$(\hat{T}_{ToT}^k)$" should read -- $(\hat{T}_{ToT}^k)$ --.

Line 19, "$(\rho_p^k)$" should read -- $(\rho_p^k)$ --.

Line 24, "$(\overline{X}_u)$" should read -- $(\overline{\hat{X}}_u)$ --.

Line 28, "$(\rho_m^k)$" should read -- $(\rho_m^k)$ --, and "$(\rho_p^k)$" should read -- $(\rho_p^k)$ --.

Lines 31, 33, 52 and 60, "$(\hat{N}_{ms}^k)$" should read -- $(\hat{N}_{ms}^k)$ --.

Line 43, "$(N_{chip}^k)$" should read -- $(N_{chip}^k)$ --.

Line 49, "$\hat{T}_{ToT}^k = T_{GPS} - \hat{N}_{ms}^k - N_{chip}^k - \Delta chip^k$" should read
-- $\hat{T}_{ToT}^k = T_{GPS} - \hat{N}_{ms}^k - N_{chip}^k - \Delta chip^k$ --.

Column 15,

Line 65, "$(\hat{T}_{ToT}^k)$" should read -- $(\hat{T}_{ToT}^k)$ --.

UNITED STATES PATENT AND TRADEMARK OFFICE
CERTIFICATE OF CORRECTION

PATENT NO. : 6,476,762 B2
DATED : November 5, 2002
INVENTOR(S) : Valio et al.

Page 3 of 3

It is certified that error appears in the above-identified patent and that said Letters Patent is hereby corrected as shown below:

Column 16,

Line 1, "$(\rho_m{}^k)$" should read $-- (\rho_m^k) --$.

Lines 3 and 36, "$(\hat{T}_{ToT}{}^k)$" should read $-- (\hat{T}_{ToT}^k) --$.

Lines 5 and 15, "$(\rho_p{}^k)$" should read $-- (\rho_p^k) --$.

Line 11, "$(\bar{X}_u)$" should read $-- (\bar{\bar{X}}_u) --$.

Line 14, "$(\rho_m{}^k)$" should read $-- (\rho_m^k) --$.

Lines 18, 20, 40 and 49, "$(\widehat{N}_{ms}{}^k)$" should read $-- (\widehat{N}_{ms}^k) --$.

Lines 29 and 32, "$(N_{chip}{}^k)$" should read $-- (N_{chip}^k) --$.

Line 37, "$\hat{T}_{ToT}{}^k = T_{GPS} - \widehat{N}_{ms}{}^k - N_{chip}{}^k - \Delta chip^k$" should read $-- \hat{T}_{ToT}^k = T_{GPS} - \widehat{N}_{ms}^k - N_{chip}^k - \Delta chip^k --$.

Column 18,

Line 1, "$(N_{chip}{}^k)$" should read $-- (N_{chip}^k) --$.

Line 28, please delete the word "by".

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,476,762 B2 Page 1 of 1
APPLICATION NO. : 09/753918
DATED : November 5, 2002
INVENTOR(S) : Valio et al.

It is certified that error appears in the above-identified patent and that said Letters Patent is hereby corrected as shown below:

<u>Column 14</u>
Line 1 "positioned" should read --position--.

Signed and Sealed this

Seventh Day of November, 2006

JON W. DUDAS
*Director of the United States Patent and Trademark Office*